US012761134B2

(12) United States Patent
Kastanja et al.

(10) Patent No.: US 12,761,134 B2
(45) Date of Patent: Oct. 13, 2026

(54) PARTICLE ANALYSIS USING LIGHT MICROSCOPE AND MULTI-PIXEL POLARIZATION FILTER

(71) Applicant: Carl Zeiss Microscopy GmbH, Jena (DE)

(72) Inventors: Indrajati Nicole Kastanja, Olching (DE); Markus Cappellaro, Munich (DE); Achim Schwarz, Taufkirchen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 443 days.

(21) Appl. No.: 18/197,952

(22) Filed: May 16, 2023

(65) Prior Publication Data

US 2023/0280260 A1 Sep. 7, 2023

Related U.S. Application Data

(63) Continuation of application No. 17/158,572, filed on Jan. 26, 2021, now Pat. No. 11,692,928.

(30) Foreign Application Priority Data

Jan. 31, 2020 (DE) ......................... 102020102419.3

(51) Int. Cl.

| | |
|---|---|
| ***G01N 15/1433*** | (2024.01) |
| ***G02B 21/00*** | (2006.01) |
| *G01N 15/14* | (2006.01) |

(52) U.S. Cl.

CPC ..... *G01N 15/1433* (2024.01); *G02B 21/0032* (2013.01); *G01N 2015/1493* (2013.01); *G01N 2015/1497* (2013.01)

(58) Field of Classification Search

CPC ....... G01N 15/1433; G01N 2015/1493; G01N 2015/1497; G01N 15/1429; G01N 15/00; G01N 21/8806; G01N 21/94; G01N 2015/0096; G02B 21/0032; G02B 21/367; G02B 21/0092; G02B 21/365

See application file for complete search history.

(56) References Cited

U.S. PATENT DOCUMENTS

| | | | | |
|---|---|---|---|---|
| 5,864,394 | A | 1/1999 | Jordan, III et al. | |
| 5,909,276 | A | 6/1999 | Kinney et al. | |
| 7,660,036 | B2 | 2/2010 | Metzger | |
| 10,475,177 | B2 * | 11/2019 | Kurahashi .......... | G01N 21/8806 |
| 10,935,501 | B2 | 3/2021 | Smith | |
| 2008/0007725 | A1 * | 1/2008 | Togashi ............. | G01N 21/9501 356/237.2 |

(Continued)

FOREIGN PATENT DOCUMENTS

| | | | | |
|---|---|---|---|---|
| DE | 102005062439 B3 | | 10/2007 | |
| DE | 102016005949 A1 | * | 12/2016 | ........... B23K 26/352 |

(Continued)

*Primary Examiner* — Michael A Lyons
*Assistant Examiner* — Judy Dao Tran
(74) *Attorney, Agent, or Firm* — Renner, Otto, Boisselle & Sklar, LLP

(57) ABSTRACT

Techniques in connection with the use of a multi-pixel polarization filter in the light-microscopic examination of a sample object are described. In this way e.g. a particle analysis can be carried out, e.g. in particular for determining the technical cleanness of a surface of the sample object.

11 Claims, 11 Drawing Sheets

(56) References Cited

U.S. PATENT DOCUMENTS

| | | | | |
|---|---|---|---|---|
| 2009/0290783 | A1 | 11/2009 | Sakai et al. | |
| 2010/0182602 | A1 | 7/2010 | Urano et al. | |
| 2011/0149275 | A1 | 6/2011 | Nakano et al. | |
| 2013/0100333 | A1* | 4/2013 | Awatsuji | G01N 21/21 348/335 |
| 2013/0293871 | A1* | 11/2013 | Gruev | G01J 4/04 356/73 |
| 2015/0296194 | A1* | 10/2015 | Cho | G02B 3/0056 348/224.1 |
| 2019/0170655 | A1* | 6/2019 | Smith | G01N 21/95607 |
| 2021/0271061 | A1* | 9/2021 | Fukazawa | A61B 1/045 |

FOREIGN PATENT DOCUMENTS

| | | | |
|---|---|---|---|
| JP | 2009-192520 | A | 8/2009 |
| WO | WO 2017/064845 | A1 | 4/2017 |

* cited by examiner

PARTICLE ANALYSIS USING LIGHT MICROSCOPE AND MULTI-PIXEL POLARIZATION FILTER

RELATED APPLICATIONS

This is a continuation of U.S. application Ser. No. 17/158,572, filed Jan. 26, 2021, which claims priority from German Application No. DE102020102419.3, filed Jan. 31, 2020, each of which is hereby incorporated by reference in its entirety.

FIELD OF THE INVENTION

Various examples of the invention relate generally to techniques for optical particle analysis by means of a light microscope. Various examples relate in particular to the use of a multi-pixel polarization filter.

BACKGROUND OF THE INVENTION

Surfaces of sample objects are examined during particle analysis. Contaminants in the form of particles are sought, identified and often evaluated statistically. One form of particle analysis is analysis of technical cleanness.

During particle analysis—for instance for determining technical cleanness—particulate contaminants on filter media, particle traps or other materials are examined by scanning the surface. This generally serves for automatically detecting objects without losing the latter by way of the movement of a sample holder, typically with the aid of a motorized scanning stage. The differentiation ("type characterization") often required in practice between particles with metallic lustre and particles without metallic lustre typically requires recording the entire area of the sample, which is generally at least 1100 $mm^2$, once with polarization and once without polarization. A polarization image and an intensity image are then examined. The image recording is the time-critical factor in the entire work sequence.

SUMMARY OF THE INVENTION

Therefore, there is a need for improved techniques for particle analysis. In particular, there is a need for techniques which enable rapid and reliable particle analysis by means of images captured by light microscopy.

This object is achieved by the features of the independent patent claims. The features of the dependent patent claims define embodiments.

Various techniques in connection with particle analysis are described below.

The techniques described herein relate generally to the use of a multi-pixel detector in connection with the light-microscopic particle analysis of a surface of a sample object.

The techniques described herein use an optical system comprising a multi-pixel detector and an assigned multi-pixel polarization filter. The multi-pixel detector comprises a plurality of detector pixel elements. The multi-pixel polarization filter comprises a plurality of polarization filter pixel elements. A spatially resolved polarization image of a sample object can be obtained in this way.

For example, the multi-pixel polarization filter could comprise a plurality of groups of polarization filter pixel elements which each filter different polarization directions. The polarization direction and the intensity of the polarization can then be determined, e.g. in a manner encoded in corresponding polarization images.

The particle analysis can then be carried out on the basis of one or more polarization images. That is to say that particles or particle objects on the surface of the sample object can be identified and evaluated (for example statistically). By way of example, using the one polarization filter or the plurality of polarization filters enables a metallic lustre of the particle objects to be identified particularly well and reliably. As a result, significant properties of the particle objects can be ascertained in connection with the particle analysis.

An optical system comprises a sample holder. The sample holder is configured to fix a sample object. The optical system additionally comprises a light microscope. The light microscope defines an illumination light path and a detection light path for microscopy of the sample object. Polarized light, for example, can be used for this purpose. The optical system additionally comprises at least one camera. The at least one camera has a multi-pixel detector and also a multi-pixel polarization filter. The multi-pixel detector comprises a multiplicity of detector pixel elements. The multi-pixel polarization filter comprises a multiplicity of polarization filter pixel elements. The multi-pixel detector is configured to provide image data on the basis of an exposure process. The optical system furthermore comprises a computer logic element. The latter is configured to calculate at least one polarization image of the sample object on the basis of pixel values of the image data. The computer logic element is additionally configured to carry out a particle analysis for a surface of the sample object on the basis of the at least one polarization image.

A method comprises controlling a multi-pixel detector. The multi-pixel detector is associated with a multi-pixel polarization filter. The method additionally comprises receiving image data by means of the multi-pixel detector. The method furthermore comprises calculating at least one polarization image of a sample object on the basis of pixel values of the image data. Furthermore, the method comprises carrying out a particle analysis for a surface of the sample object on the basis of the at least one polarization image.

A computer program or a computer program product or a computer-readable storage medium comprises program code which can be loaded and executed by a processor. When the processor executes the program code, a method is implemented. The method comprises controlling a multi-pixel detector. The multi-pixel detector is associated with a multi-pixel polarization filter. The method additionally comprises receiving image data by means of the multi-pixel detector. The method furthermore comprises calculating at least one polarization image of a sample object on the basis of pixel values of the image data. Furthermore, the method comprises carrying out a particle analysis for a surface of the sample object on the basis of the at least one polarization image.

A multi-pixel detector and a multi-pixel polarization filter are used in the light-microscopic examination of a sample object.

The features set out above and features that are described below may be used not only in the corresponding combinations explicitly set out, but also in further combinations or in isolation, without departing from the scope of protection of the present invention.

DETAILED DESCRIPTION OF THE INVENTION

Figure 1:
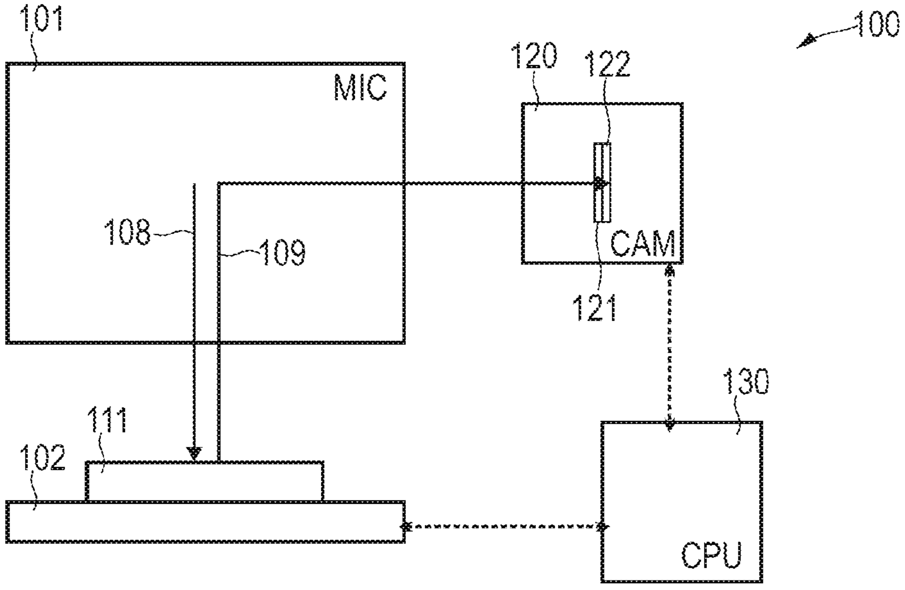
FIG. 1 schematically illustrates an optical system in accordance with various examples.

The properties, features and advantages of this invention described above and the way in which they are achieved will become clearer and more clearly understood in association with the following description of the exemplary embodiments which are explained in greater detail in association with the drawings.

The present invention is explained in greater detail below on the basis of preferred embodiments with reference to the drawings. In the figures, identical reference signs denote identical or similar elements. The figures are schematic representations of various embodiments of the invention. Elements illustrated in the figures are not necessarily illustrated as true to scale. Rather, the various elements illustrated in the figures are rendered in such a way that their function and general purpose become comprehensible to the person skilled in the art. Connections and couplings between functional units and elements as illustrated in the figures can also be implemented as an indirect connection or coupling. A connection or coupling can be implemented in a wired or wireless manner. Functional units can be implemented as hardware, software or a combination of hardware and software.

Various techniques in connection with the light-microscopic examination of sample objects are described below. In particular, the techniques described herein can use a camera having a multi-pixel detector for digitally capturing image data which image the sample object. In various examples described herein, a multi-pixel polarization filter is arranged in the corresponding detection light path.

The multi-pixel polarization filter can have a plurality of polarization filter pixel elements. The polarization filter pixel elements can therefore provide a spatial resolution for the polarization of the light from the sample object. It would be possible for the polarization filter pixel elements each to filter different polarization directions (i.e. either to allow the respectively polarized light to pass or to block it).

The polarization filter pixel elements of the multi-pixel polarization filter can be arranged in a manner corresponding to the detector pixel elements of the multi-pixel detector. That is to say that different polarization filter pixel elements of the multi-pixel detector are associated with different detector pixel elements of the multi-pixel polarization filter. That is to say that differently polarized light that propagates along the detection light path is filtered by the various polarization filter pixel elements of the multi-pixel polarization filter and is subsequently detected by the detector pixel elements of the multi-pixel detector.

In various examples, the multi-pixel detector and the multi-pixel polarization filter can be integrated, that is to say can be fabricated on a common substrate—typically silicon. This is sometimes also referred to as "on-chip polarizer filter". See WO 2017/064845 A1, for example.

Crucial advantages of the use of such a multi-pixel polarization filter—in particular in comparison with the use of a large-area polarization filter to be introduced into the detection beam path mechanically—are based on: (1) Reduction of optical crosstalk effects. This enables a homogeneous, spatially accurate resolution of the polarization effects at the light microscope. (2) Increase in performance: The simultaneous recording of the entire polarization information over a defined sample surface is associated with a substantial increase in speed by comparison with sequential recording by means of mechanically or electronically (LCD) rotated polarizers. (3) Increase in quality: By avoiding movable, e.g. electrically or mechanically operated optical or LCD polarization filters, such a technique is more robust vis-à-vis contaminants and/or material failure during continuous operation. A possible shift problem in the case of sequential recording with various polarization directions is not applicable, in principle, in the case of a single-shot recording.

The various examples make it possible, in particular, to carry out a particle analysis for a surface of the sample object (sample surface). What could be obtained as the result of the particle analysis is for example a marking of particle objects in a result image representing the sample surface. An evaluation of the particle objects present on the sample surface could also be obtained, for example a statistical evaluation. Possible characteristic variables comprise, for example: Number of particle objects per area; particle object types; number of particle objects depending on size class of the particle objects; etc.

One specific implementation of the particle analysis is the determination of a coefficient of measure that is indicative of the technical cleanness of the surface of the sample object. Technical cleanness is a standard-based application. The work sequence and the method for detecting particulate contaminants are described in national, international and in-house standards and guidelines. By way of example, technical cleanness can be determined according to one of the standards: VDA 19 or ISO 16232.

In particular, the use of the combination of multi-pixel detector and multi-pixel polarization filter makes it possible to carry out an analysis of the polarization of the light reflected by particle objects. Specifically, one or more polarization images can be generated from the image data which are received by the multi-pixel detector.

As a general rule, a polarization image can have a contrast that is dependent on the polarization of the incident light. For example, it would be possible for a polarization image to have a contrast that encodes the polarization direction or the intensity of the polarization. A polarization image could also encode a specific component of the polarization, for example 0° or 90°.

In the various examples, it would be conceivable for a metallic lustre of a particle object to be ascertained for example on the basis of a contrast of one or more polarization images. It would be possible for particle object types to be segmented in the polarization image. The image with 90° polarization could be used e.g. for evaluating particle object size, particle object type (e.g. fibre, dust, etc.) and other features of the extracted particle objects. For the particle objects, an analysis of the pixel brightness in the one or more polarization images could be carried out (and e.g. be compared with one another in order to determine a degree of the polarization in this way), for instance by applying mathematical boundary conditions. By way of example, a differentiation between objects with and without metallic lustre (high asymmetry of the brightness vs. low asymmetry of the brightness) could be performed by comparing a polarization image that encodes 0° polarization with the 90° polarization image.

FIG. 1 schematically illustrates an optical system 100.

The optical system 100 comprises a sample holder 102. The sample holder 102 is configured to fix a sample object 111. The sample holder 102 can comprise a fixing element that grips and fixes the sample object 111. The fixing element could be implemented e.g. as an insert frame. The sample holder 102 could be embodied in a motorized fashion, for example, that is to say comprise a scanning stage with one or more motors enabling a lateral displacement for a composite image recording of the sample object 111 (stitching). To that end, the sample holder 102 can be controlled by a computer logic element 130, as illustrated in FIG. 1.

The computer logic element 130 could be implemented e.g. by a CPU that can load and execute program code from a memory. It would also be possible for the computer logic element 130 to be implemented by an application-specific integrated circuit or an FPGA.

The optical system 100 also comprises a light microscope 101. The light microscope 101 is configured to enable light-microscopic recordings (microscopy) of a surface of the sample object 111, using reflected-light geometry in the example in FIG. 1. To that end, the light microscope 101 comprises a light source (not illustrated in FIG. 1) in order to illuminate the sample object 111 along an illumination light path 108. The light incident on the sample object 111 is typically polarized, i.e. typically linearly polarized. To that end, a polarizer can be arranged in the illumination light path 108. It would also be possible to use a light source that provides polarized light.

In some examples, in different operating modes in each case (i) polarized light or (ii) unpolarized light could be used for illuminating the sample object 111. To that end, e.g. the polarizer could be able to be pushed into and out of the illumination light path 108.

The light microscope 101 furthermore defines a detection light path 109 for microscopy of the sample object 111.

A camera 120 is connected to the light microscope 101. The camera 120 comprises a multi-pixel detector 122 and also a multi-pixel polarization filter 121 associated with the multi-pixel detector 122. Therefore, the multi-pixel polarization filter 121 and the multi-pixel detector 122 act as an analyser for the polarized sample light. The light propagating along the detection light path 109 impinges on the multi-pixel detector 122, which captures corresponding image data. To that end, the camera 120 can also comprise a lens optical unit (not illustrated in FIG. 1). The camera 120 and, in particular, the multi-pixel detector 122 can be controlled and read by the computer logic element 130.

The multi-pixel detector 122 can have a sensitivity in different spectral ranges, for example in the visible spectrum or else in the infrared spectrum or the near ultraviolet spectrum. The detected spectral range can be e.g.: 350-1000 nm.

As a general rule, the computer logic element 130 can implement one or more of the following techniques: Control of motorized components of the microscope 101; control of the sample holder 102, e.g. in particular of a scanning stage of the sample holder 102; control of the digital camera 120, with polarization sensor 121-122 for image recording with a defined polarization; simultaneous image recording of various, selected polarization directions; determining the image brightness of a defined sample area with a corresponding polarization image; generating focussed images of the sample object with shading correction, of a defined image brightness; determining polarization images which encode a polarization direction, a polarization intensity, and/or a component of the polarization in a defined direction; segmentation and image analysis for extracting particle objects from the image background, for instance in the context of a particle analysis; analysing the polarization information of the detected particle objects, for instance in the context of a particle analysis; evaluating the detected particle objects with regard to size, type and metallic lustre, for instance in the context of a particle analysis; outputting the classification results according to size and type, for instance in the context of a particle analysis; and/or archiving the results.

Figure 2:
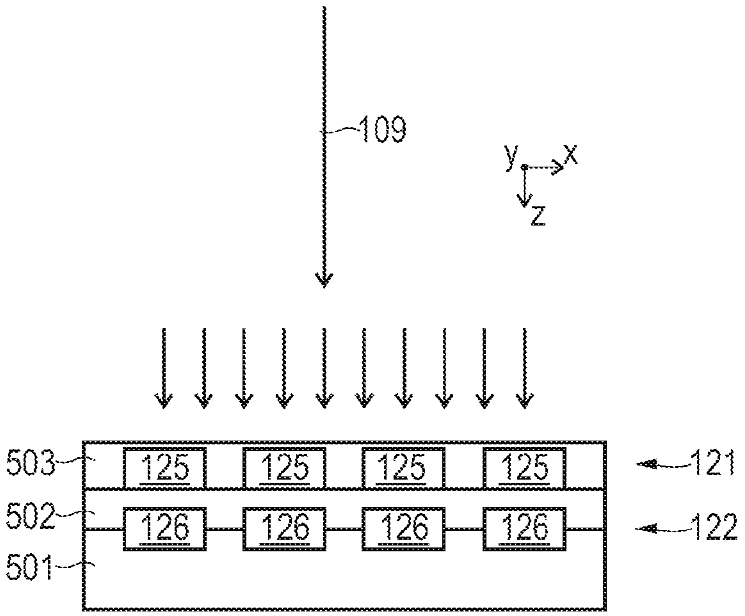
FIG. 2 schematically illustrates a system comprising a multi-pixel polarization filter and a multi-pixel detector in accordance with various examples.

FIG. 2 illustrates aspects in connection with the multi-pixel polarization filter 121 and with the multi-pixel detector 122. The example in FIG. 2 illustrates a scenario in which the multi-pixel polarization filter 121 and the multi-pixel detector 122 are integrated on a common substrate 501, e.g. silicon. Corresponding layers 502, 503 composed of semiconductor material are applied on the substrate 501, in and/or on which layers the polarization filter pixel elements 125 of the multi-pixel polarization filter 121 and also the detector pixel elements 126 of the multi-pixel detector 122 are defined. The polarization filter pixel elements 125 of the multi-pixel polarization filter 121 can be implemented e.g. by grating structures oriented according to the filtered polarization direction.

In this case, it is possible for different polarization filter pixel elements 125 of the multi-pixel detector 122 in each case to filter different polarization directions (i.e. the corresponding elements can each be oriented differently in the plane of the substrate 501).

It is evident from FIG. 2 that a polarization filter pixel element 125 is respectively assigned to a detector pixel element 126. That is to say that light that propagates along the detection light path 109 passes through a specific polarization filter pixel element 125 and is filtered according to its polarization and then impinges on an associated detector pixel element 126 of the multi-pixel detector 122.

It is assumed that the errors as a result of offsets, nonlinearities, sensor sensitivity inhomogeneities or polarization filter inhomogeneities either are sufficiently small or have been dealt with by calibration. As a result, the filtered light intensity at a detector pixel element 126 can be assumed to be proportional to the measured pixel intensity—i.e. the pixel value of the corresponding image data.

The combination of multi-pixel detector 122 and multi-pixel polarization filter 121 thus makes it possible, in an exposure process, to capture image data in which different pixel values in each case of the light intensity are encoded in different polarization directions.

Figure 3:
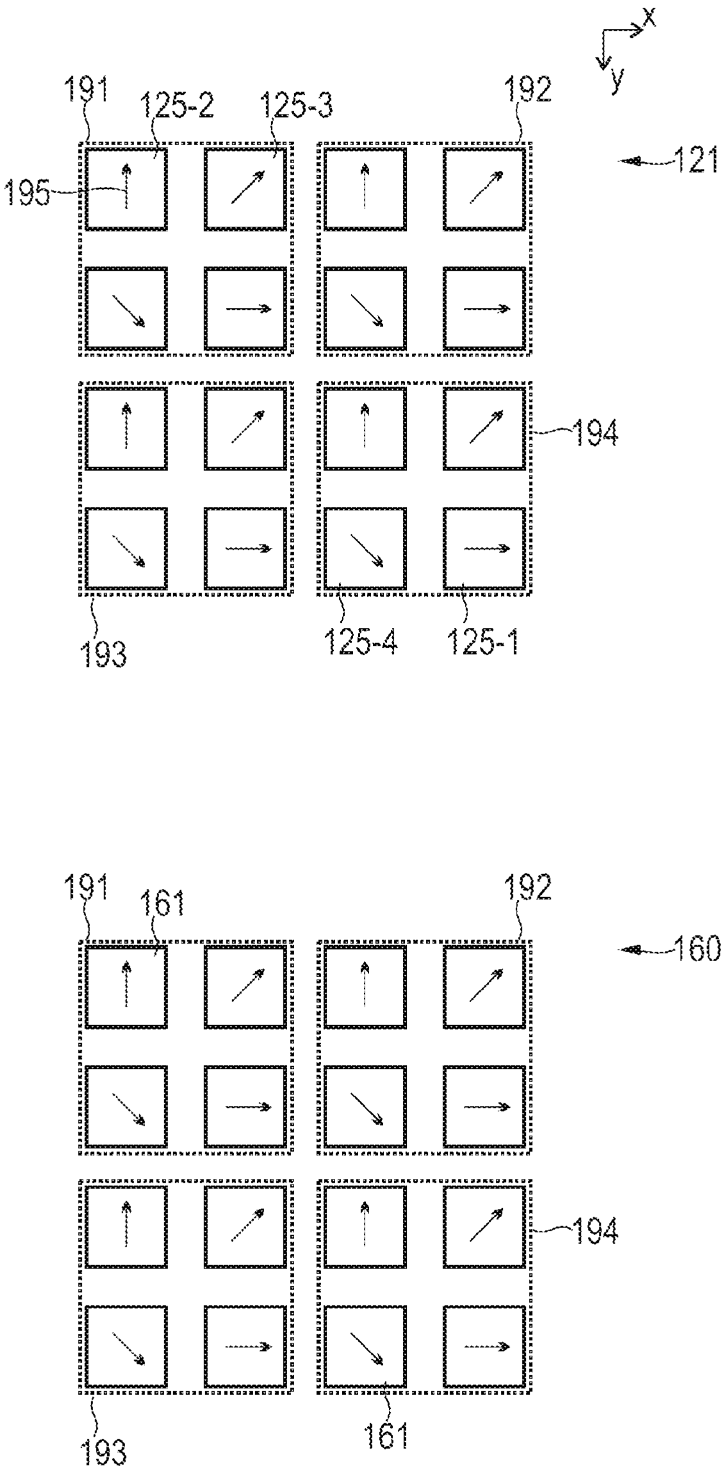
FIG. 3 schematically illustrates a lateral arrangement of pixels of the multi-pixel polarization filter and associated image data, in accordance with various examples.

While FIG. 2 illustrates aspects in connection with the vertical arrangement of the polarization filter pixel elements 125 and respectively the detector pixel elements 126 (that is to say perpendicular to the surface of the substrate 501), FIG. 3 illustrates aspects concerning the lateral arrangement of the polarization filter pixel elements 125 (and respectively detector pixel elements 126, although the detector pixel elements 126 of the multi-pixel detector 122 are not illustrated in FIG. 3).

FIG. 3 illustrates aspects in connection with the multi-pixel polarization filter 121. FIG. 3 illustrates aspects in connection with the lateral arrangement of the polarization filter pixel elements 125-1-125-4. The polarization filter pixel elements 125-1-125-4 correspond to the polarization filter pixel elements 125 from FIG. 2, but in FIG. 3 there is differentiation with regard to the filtered polarization direction 195 (in FIG. 3, the respectively filtered polarization direction 195 is represented by the arrows).

It is evident from FIG. 3 that the polarization filter pixel elements 125-1 of the multi-pixel polarization filter 121 carry out a filtering with respect to 0° polarization direction; that the polarization filter pixel elements 125-2 carry out a filtering with respect to 90° polarization direction; that the polarization filter pixel elements 125-3 carry out a filtering with respect to 45° polarization direction; and that the polarization filter pixel elements 125-4 carry out a filtering with respect to 135° or −45° polarization direction.

The polarization filter pixel elements 125-1-125-4 are arranged in a laterally interleaved manner. That is to say that all polarization directions from the set {0°, 45°, 90°, 135°} can be measured in each case for each of the regions 191-194. That is to say that the native resolution of the system comprising multi-pixel polarization filter 121 and multi-pixel detector 122 correlates with the size of the regions 191-194.

In the example in FIG. 3, the polarization filter pixel elements 125-1 and 125-2 thus form a basis for the space of the polarization directions (that is to say the polarization directions in the plane of the pixels 125-1-125-4). If the pixel values of the image captured by the multi-pixel detector 122 which are associated with the polarization filter pixel elements 125-1 and 125-2 are suitably evaluated, it is possible to deduce the direction of the polarization of the incident light (by means of vector addition and/or fundamental geometric considerations). A further basis is formed by the polarization filter pixel elements 125-3 and 125-4.

The values I(a) represent the intensity for the quantity of light passing through the filter according to the polarization direction, i.e. I(a) is proportional to the pixel value for the respective pixel of the image data.

The intensity I of a light beam for an arbitrary angle a can be split into two mutually orthogonal components I(a) and I(a+90°), which thus form a basis. In this case, a denotes the angle of the polarization direction:

$$I = I(a) + I(a + 90°) \tag{1}$$

For two polarization angles a and b—which can be selected e.g. by two of the polarization filter pixel elements 125-1-125-4—that results in:

$$I = I(a) + I(a + 90°) = I(b) + I(b + 90°) \tag{2}$$

A transformation of equation (2) shows that a pixel value of the image data (e.g. for region 191) that corresponds to I(a) can be calculated by way of the other three pixel values of the image data in the region 191:

$$I(a) = I(b) + I(b + 90°) - I(a + 90°) \tag{3}$$

For elucidation, a=0° and b=45° shall hold true here, which results in this equation:

$$I(0°) + I(90°) = I(45°) + I(135°) \tag{4}$$

That is also the case for the polarization directions filtered in the example in FIG. 3, namely the two bases {0°, 90°} and {45°, 135°}, as described above.

The transformed equations are accordingly:

$$I(0°) = I(45°) + I(135°) - I(90)° \tag{5}$$

$$I(45°) = I(0°) + I(90°) - I(135°) \tag{6}$$

$$I(90°) = I(45°) + I(135°) - I(0°) \tag{7}$$

$$I(135°) = I(0°) + I(90°) - I(45°) \tag{8}$$

FIG. 3 also illustrates image data 160 which are obtained by the multi-pixel detector. In this case, it is evident from FIG. 3 that the different pixel values of the image data 160 are assigned to the different polarization filter pixel elements 125-1 to 125-4, and thus encode I(a). That is to say, therefore, that the image data 160 include pixel values whose contrast encodes different components of the polarization direction. It is possible for these different pixel values to be treated differently in order in this way to collect information about the polarizing property of particle objects in a targeted manner, as illustrated in FIG. 4.

Figure 4:
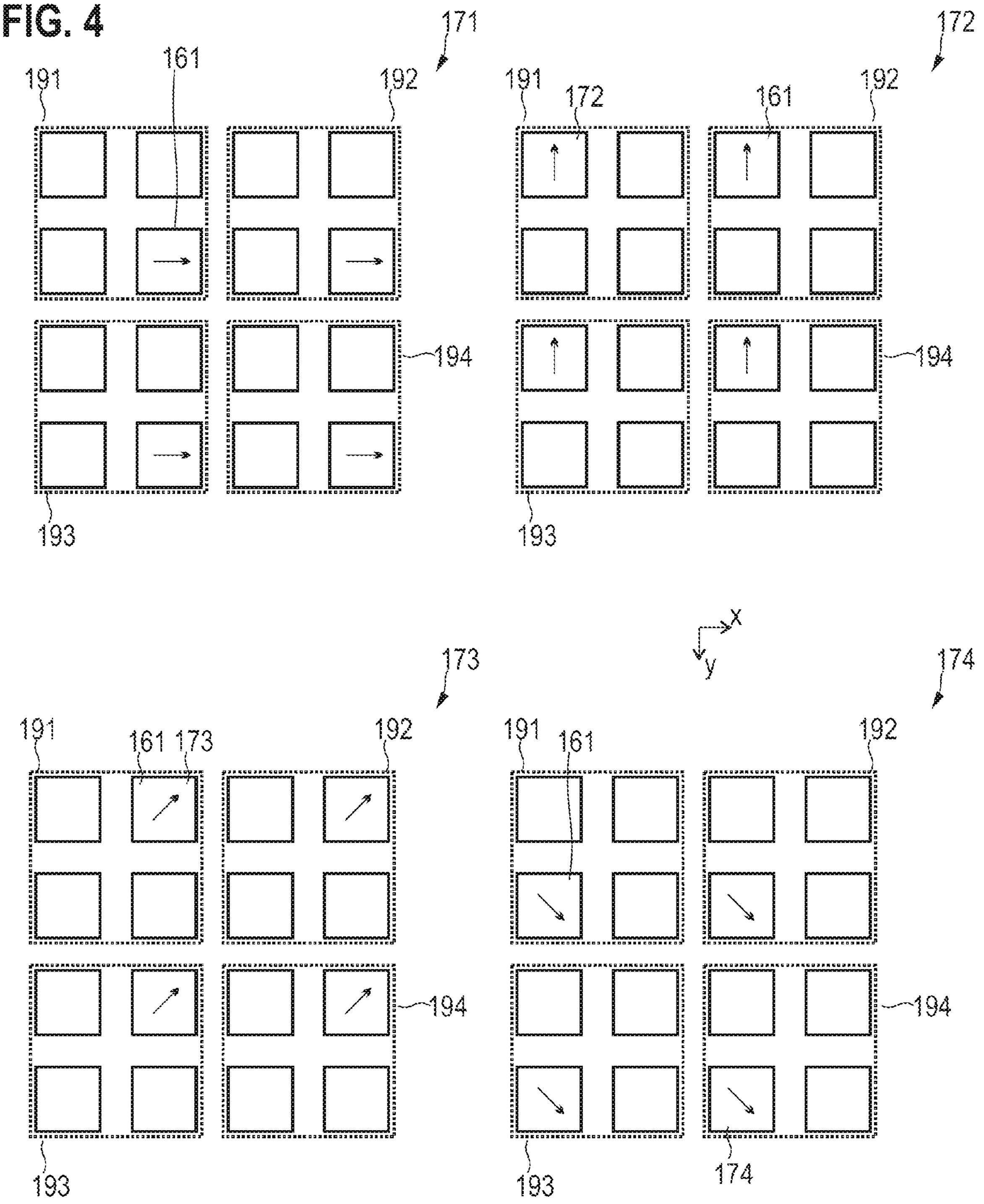
FIG. 4 schematically illustrates groups of pixels of image data which are obtained by the multi-pixel detector and which correlate with the pixels of the multi-pixel polarization filter, in accordance with various examples.

FIG. 4 illustrates aspects with regard to four groups 171-174 of pixel values 161 of the image data 160 which are obtained by the multi-pixel detector 122. These groups 171-174 of pixel values 160 can also be called channels. A first channel 171 comprises the measured signals of the detector pixel elements of the multi-pixel detector 122 which are associated with the pixels 125-1 of the multi-pixel polarization filter 121. That is to say that the channel 171 encodes the polarization direction 0°. Correspondingly, the channel 172 encodes the polarization direction 90°; the channel 173 encodes the polarization direction 45°; and the channel 174 encodes the polarization direction 135°. That is also evident from a comparison of FIG. 4 with FIG. 3.

The channel 171 and the channel 172 thus include polarization information that forms a basis for the space of the polarization directions; as do the channel 173 and the channel 174.

Figure 5:
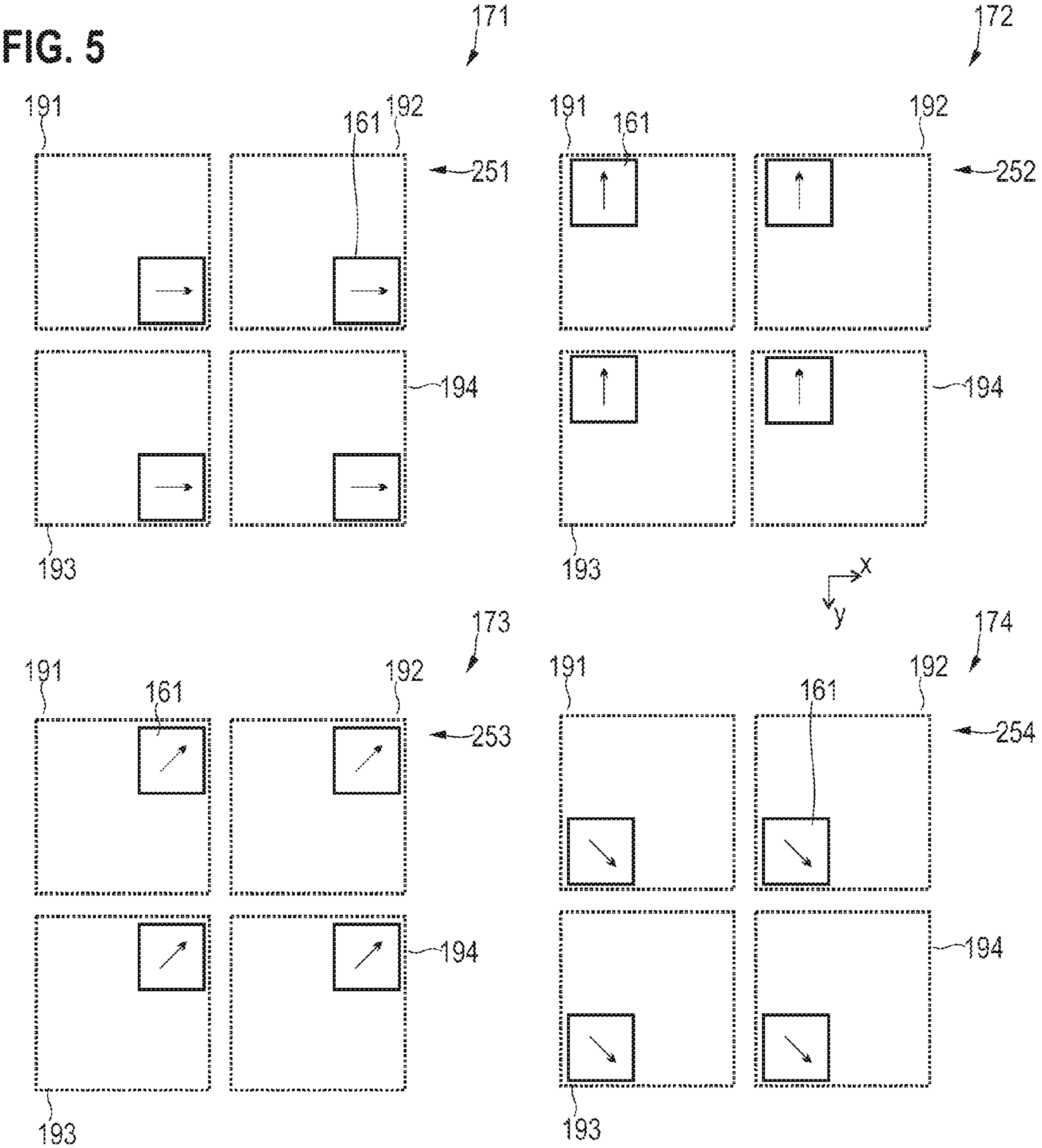
FIG. 5 schematically illustrates a channel image which can be obtained from the image data by the multi-pixel detector in accordance with various examples.

It is evident from FIG. 4 in turn that for each of the regions 191-194 an individual pixel value is obtained for each of the channels 171-174. FIG. 5 illustrates a corresponding channel image 251 which is obtained on the basis of the pixel values for the channel 171. For each channel 171-174 a corresponding channel image 251-254 can be obtained by extracting the associated pixel values 161 from the image data 160. In other words, pixel values 161 of the respective channel 171-174 can be selected in a targeted manner.

Figure 6:
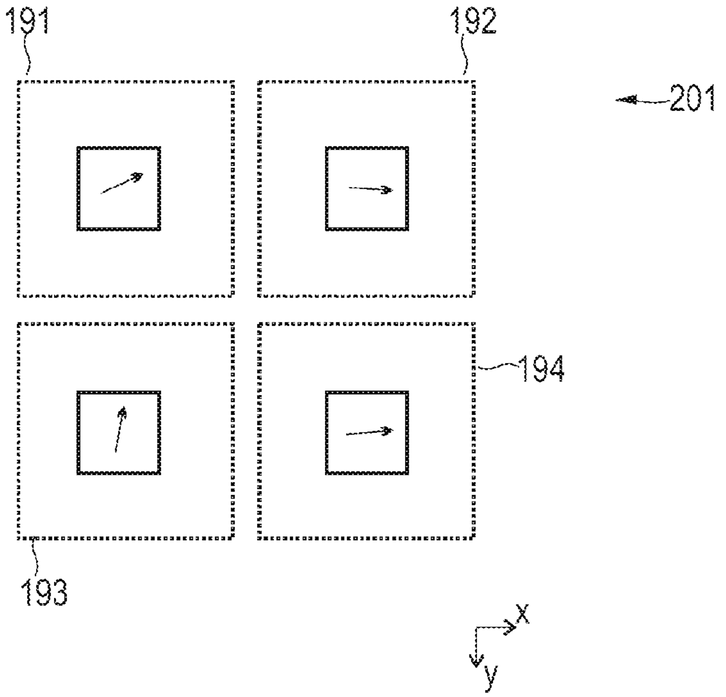
FIG. 6 schematically illustrates a polarization image and an intensity image in accordance with various examples.
Figure 6:
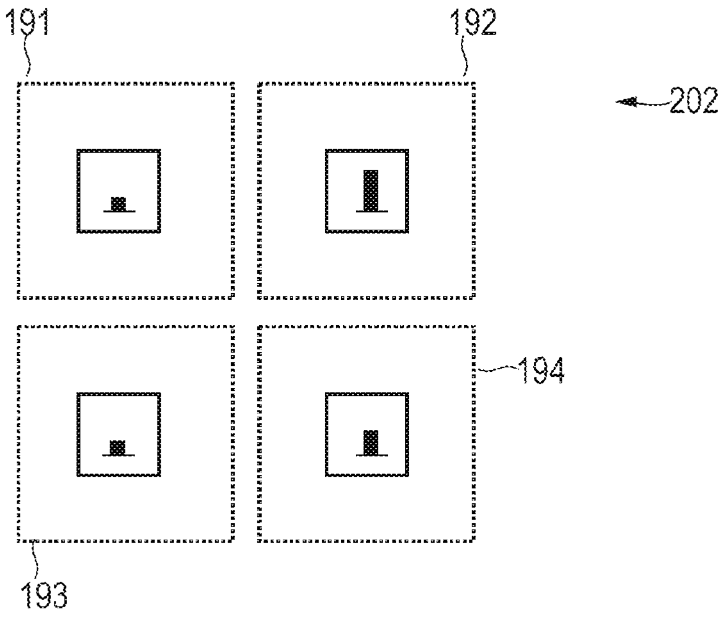

A polarization image 201 and an intensity image 202 can then be calculated from the pixel values 161 of the channels 171-174 (or on the basis of the channel images), cf. FIG. 6.

The polarization image 201 can encode e.g. the polarization direction or the intensity of the polarization. The polarization image 201 could also encode the intensity of the polarization along a specific polarization direction, i.e. a component of the polarization: to that extent each channel image 251-254 can already be designated as a polarization image 201.

The intensity of the light—for the intensity image 202—can be obtained by removing the polarization contrast in accordance with equation (1). However, the intensity image 202 could generally also be detected by means of a separate detector—without an upstream polarization filter. To that end, the camera 120 can have a beam splitter that splits the detection beam path 109 for the two detectors.

Figure 7:
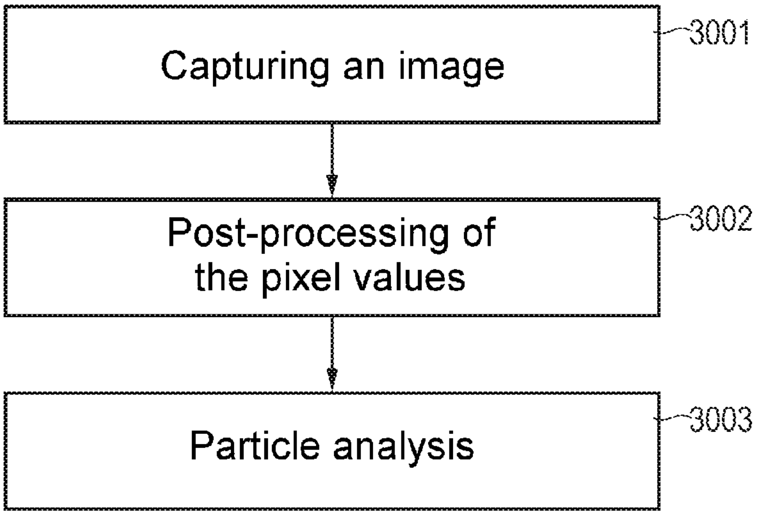
FIG. 7 is a flowchart of one exemplary method.

FIG. 7 illustrates a method in accordance with various examples. By way of example, the method from FIG. 6 could be implemented by a computer logic element of an optical system, e.g. could be implemented by the computer logic element 130 of the optical system 100. This can be done for example on the basis of program code that is loaded from a computer-readable storage medium.

In block 3001, the capturing of image data is initiated. To that end, for example, the multi-pixel detector 122 could be suitably controlled and the corresponding image data could then be received. An exposure process can be initiated. For example, the various detector pixel elements 126 of the multi-pixel detector 122 can be initialized in connection with the exposure process and then be read—after exposure.

The pixel values of the image data from block 3001 are subsequently post-processed in block 3002. The polarization image 201 and optionally the intensity image 202 can be obtained on the basis of this post-processing.

As a general rule a variety of techniques can be applied in connection with the post-processing in block 3002.

By way of example, the polarization image 201 can be calculated by a procedure in which, in a targeted manner, for example, the pixel values of the channel 171 are read out, i.e. the channel image 251 is calculated, and the respective contrast of pixels of the polarization image 201 is determined on the basis of the contrast of the pixels of the channel 171. For example, the polarization direction or the intensity of the polarization could be determined, e.g. by the channel 171 and also the channel 172 (which form a basis) being read and computed with one another.

Figure 8:
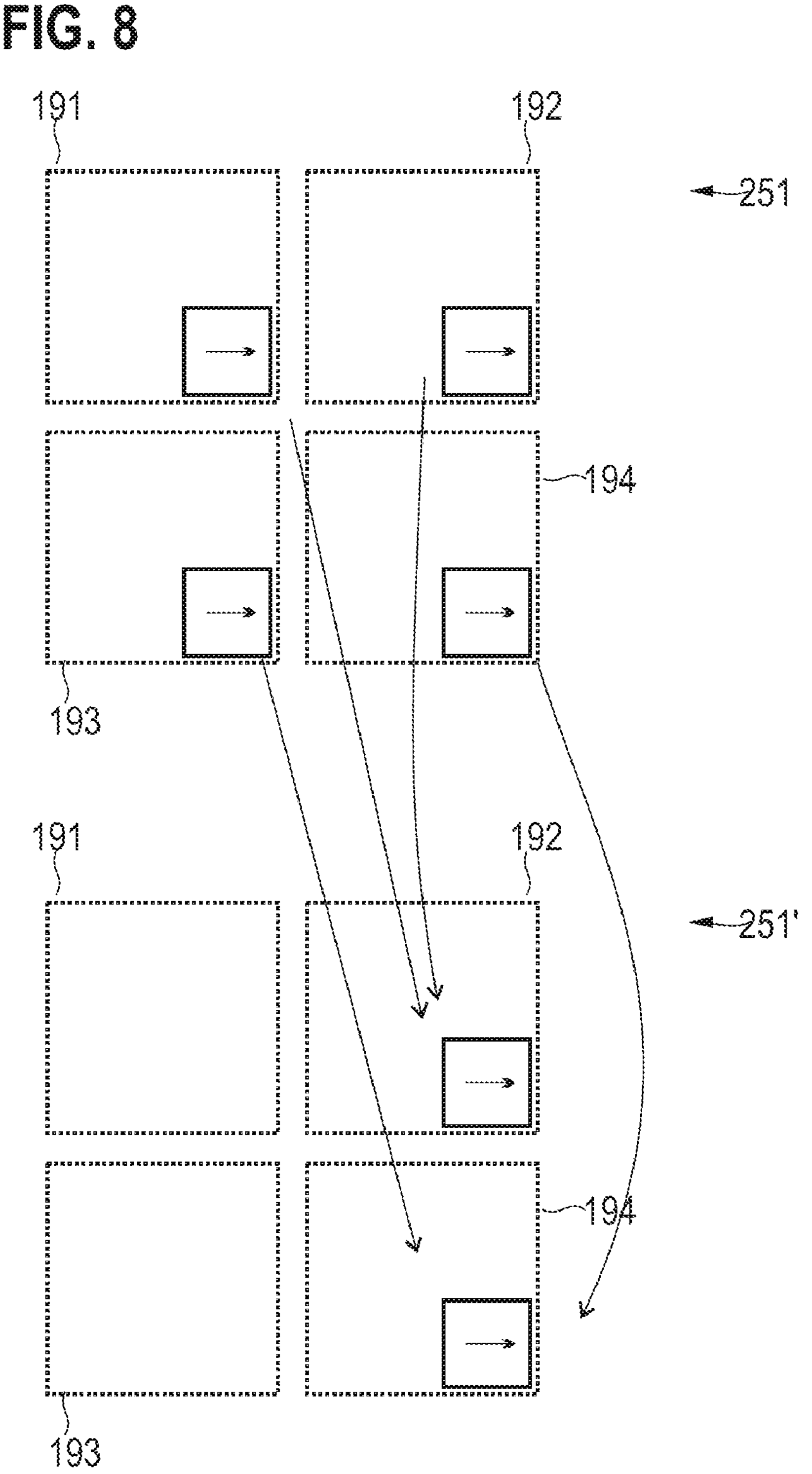
FIG. 8 schematically illustrates the averaging of pixel values of a channel image in accordance with various examples.

It would be possible to average neighbouring pixel values of a channel 171-174, e.g. for each channel 171-174. That is illustrated in FIG. 8, where a corresponding averaged channel image 251' with reduced resolution is obtained from the channel image 251. While FIG. 8 illustrates a 1×2 averaging (i.e. the pixel values of the regions 191 and 192 are computed with one another and the pixel values of the regions 193 and 194 are computed with one another), a 2×2 averaging or a 2×1 averaging or other averagings would also be conceivable.

An improvement of the image quality of the polarization image can also be striven for as part of block 3002. This can be striven for e.g. by way of an increase of the resolution of the polarization image in the context of a compensation or a reduction of the loss of resolution through the use of the multi-pixel polarization filter 121 (and optionally a multi-pixel spectral filter, cf. FIGS. 11-12). A few corresponding examples are described below.

Figure 9:
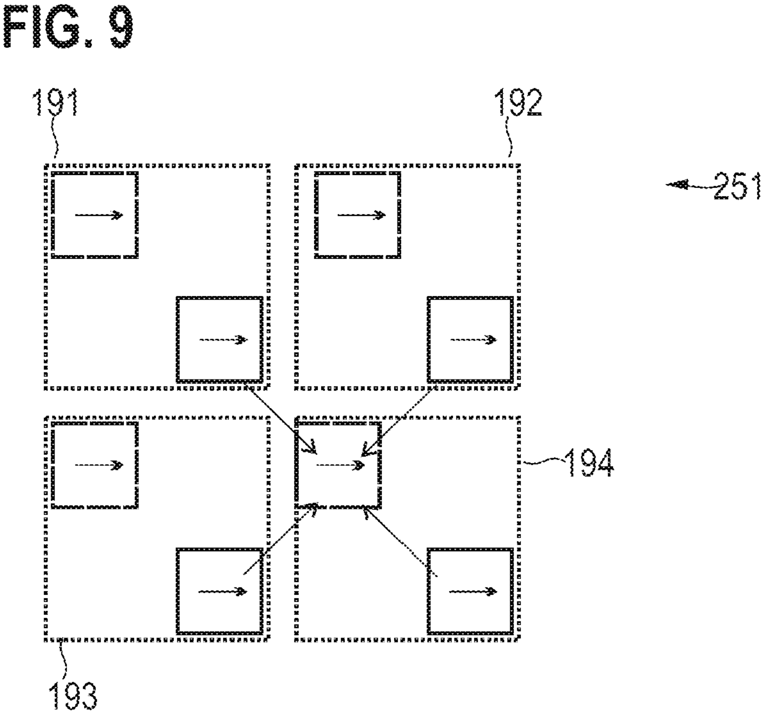
FIG. 9 schematically illustrates the interpolation of pixel values of a camera image in accordance with various examples.

A first example uses an interpolation: In some examples, pixel values of the image data can also be interpolated in the context of the post-processing. By way of example, for each channel 171-174 in each case the respective pixel values could be interpolated in order to increase the resolution of the respective channel 171-174. One exemplary interpolation is illustrated in FIG. 9 by means of the arrows for the channel 171 or the channel image 251. The channel image 251 thereby acquires a higher resolution. As a result, the polarization image 201 can have a higher resolution.

The interpolation scheme can be for example a known method such as nearest neighbour, bilinear or Akima spline interpolation. However, the interpolation requires border handling that can handle the missing values there. Suitable border handling possibilities are, inter alia, "reflecting", "mirroring" or "replicating" as described for example in Harney, Leonard GC. "A functional approach to border handling in image processing." 2015 International Conference on Digital Image Computing: Techniques and Applications (DICTA). IEEE, 2015.

A second example uses the combination of independently ascertained values for the polarization. To that end, it is possible to have recourse to pixel values from two groups of channels 171-172 and 173-174. The channels 171-172 and the channels 173-174 in each case form a basis, as described above. That is to say that—for each region 191-194—the respective polarization intensity or polarization direction can be calculated independently on the basis of the pixel values of the channel images of the channels 171-172 and of the channels 173-174. An averaging or combination can then be effected, for example, in order to increase the signal-to-noise ratio. The combination could be effected e.g. in a weighted manner.

This can be described by a reconstruction of the polarization calculated e.g. on the basis of the channels 171-172 fora specific region 191-194 by means of the channels 173-174. As a result, the polarization image 201 can be provided with a better signal-to-noise ratio, for example by the average being calculated or some other averaging being carried out.

By way of example—in a specific implementation—for each channel image at least one alternative value $I_{alt}(a)$ could be calculated by applying—in accordance with equations (5) to (8)—the following equation:

$$I_{alt}(a)=I(b)+I(b+90°)-I(a+90°).$$

I(x) denotes the measured or interpolated pixel values from the channel images.

A new pixel value Ir(a) can be calculated by means of a combination function that computes the measured or interpolated value I(a) with the alternative values $I_{alt}(a)$. The new pixel value Ir(a) can then be the final output value for the pixel in this channel.

One special case of a combination function for the combination of I(a) with $I_{alt}(a)$—or generally of the values calculated by use of the two bases—would be the calculation of a weighted average of the input values.

A further special case of a combination function would be the calculation of a weighted average of two input values with weights of 0.5.

Referring once again to FIG. 7: Afterwards, in block 3003, the particle analysis is carried out on the basis of the polarization image 201. By way of example, a coefficient of measure that is indicative of the technical cleanness of the surface of the sample object could be determined.

In block 3003, it is possible to effect e.g. a detection, analysis and identification of plastics (microparticles in drinking water & seawater; purification of process water in the chemical industry), also in combination with fluorescence methods.

In block 3003, it is possible to use a machine learning method, for improving existing type classification results particularly of such materials having only little contrast with respect to the sample matrix.

In this case, such techniques can be used to effect an examination of arbitrary material classes in terms of type and number, such as e.g. of metals, plastics, materials such as wood, inorganic materials such as corundum or quartz.

In block 3003, a result of the particle analysis can be output to the user. The representation of the result for assessing the quality of the result can be effected on the basis of predefined limit values. This enables the results of the particle analysis to be documented and archived.

If necessary, the work sequence can be documented according to predefined criteria. The work sequence can be effected in an automated manner in order to minimize user influence and to obtain reproducible classification results.

The detection and analysis of the particle contamination are carried out using a system for technical cleanness analysis. This is done using a light microscope with polarizer or polarization filter, a sample holder with motorized scanning stage, a camera with polarization sensor, a workstation and also software for image recording with an algorithm for extracting and storing images with defined polarization directions.

The method in accordance with blocks 3001-3003 can thus implement for example a work sequence described below:

One or more samples are positioned on the scanning stage. All required basic settings as well as the complete work sequence are preconfigured and stored beforehand in a job template by a supervisor. The preconfigured job template is implemented by an operator. (In smaller laboratories, supervisor and operator may be one and the same person.)

(i) The basic settings for image recording are stored in an image recording profile. They comprise the setting of objective magnification and, depending on the light microscope used, the field and aperture stops, contrast method, light brightness and image brightness. Furthermore, the images to be stored of the desired polarization directions and a shading correction are defined.

(ii) Basic settings for sample recording: Configuration of the number, size and position of the sample regions to be recorded.

(iii) The basic settings for classification are effected by way of a standard editor in which besides the definition of the size classes to be evaluated as standard, limit values with respect to class results (allowed number of objects per size class/type) and with respect to individual objects (object size/type that can be afforded tolerance) are also defined.

The described basic settings (i to iii) are stored together with the complete work sequence in a so-called job template.

After the start of the job template, automatically the basic settings for image recording (i) are applied and the samples are recorded with these settings. In this case, a respective multi-channel image with the preconfigured polarization directions is generated for each sample. After the recording of all samples, the further work sequence is carried out individually to the end for each sample until it is effected in its entirety again for the next sample. This process is automatically repeated until all samples have been analysed. Finally, the generated data and results are stored in an archive.

After the sample recording and image processing, the multi-channel image is evaluated e.g. separately according to its polarization directions, i.e. the various channel images could be evaluated individually. The objects are extracted from the image background on the basis of an automatic segmentation.

The result of the size and type classification is shown in an interactive result view with class tables, diagrams and an image gallery of the analysed objects according to type. For rapid assessment of the quality of the result, those classes and objects which lie outside the predefined limit values are represented in a manner highlighted in colour. All data, encompassing the recorded sample images, tables, diagrams and result views, are automatically stored in an archive.

Figure 10:
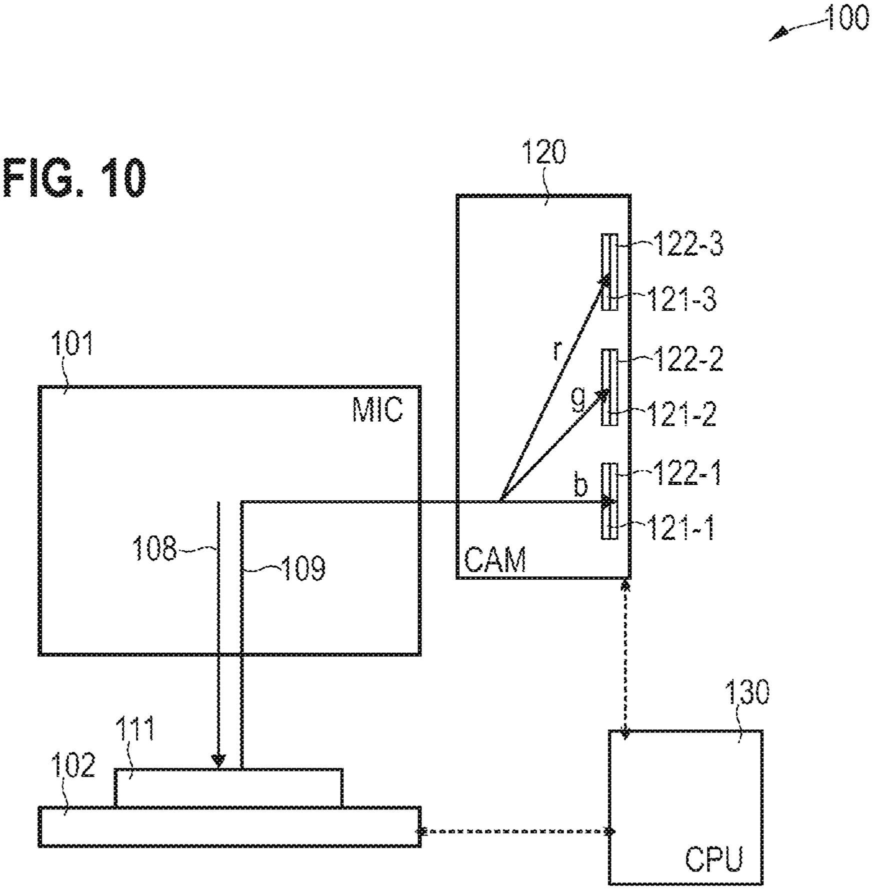
FIG. 10 schematically illustrates an optical system in accordance with various examples.

FIG. 10 illustrates aspects in connection with the optical system 100. The optical system 100 in accordance with FIG. 10 is a variant of the optical system 100 in accordance with FIG. 1. FIG. 10 illustrates a scenario in which the camera 120 has a plurality of pairs of multi-pixel detectors 122-1-122-3 and multi-pixel polarization filters 121-1-121-3. The camera 120 can have a beam splitter, for example, in order to split the detection beam path 109. The different split parts of the detection beam path 109 can correspond for example to different spectral ranges, for instance red-green-blue (indicated in FIG. 10); corresponding spectral filters can be provided for this purpose. In this way it would be possible to reconstruct a colour image of the surface of the sample object or else to take account of the differing visibility of particle objects in the different spectral ranges in connection with the particle analysis. By way of example, it is thereby possible to define different types of particle objects in connection with the colour thereof. By way of example, it would be conceivable for the method in accordance with FIG. 7 to be implemented in each case for each of the image data from the various multi-pixel detectors 122-1-122-3.

A further possibility for carrying out a spectrally resolved image analysis would be to use a plurality of cameras 120 in accordance with a scenario from FIG. 1, the various cameras 120 being associated with different spectral ranges (for instance by virtue of corresponding spectral filters being used).

Figure 11:
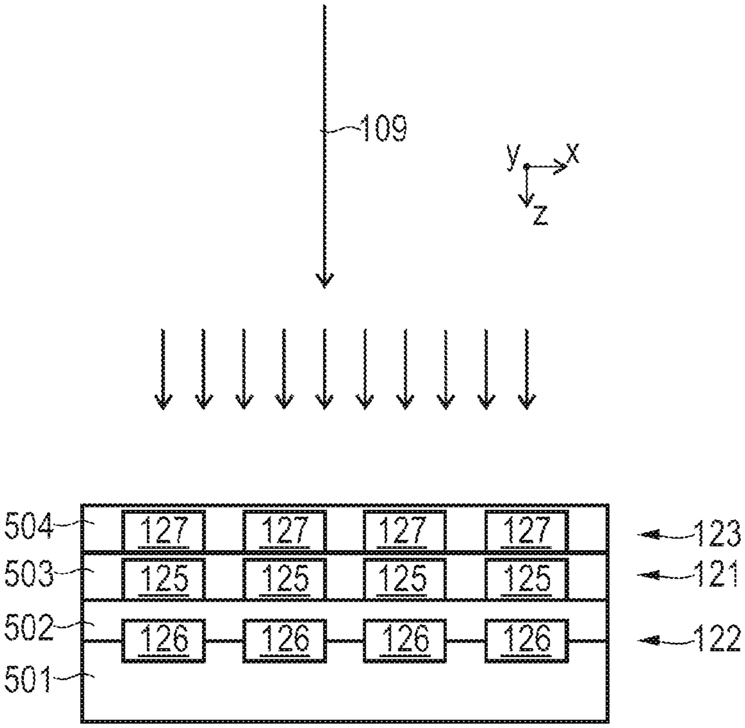
FIG. 11 schematically illustrates a system comprising a multi-pixel polarization filter, a multi-pixel detector and a multi-pixel spectral filter in accordance with various examples.

Yet another possibility for carrying out a spectrally resolved image analysis would be to use an arrangement in accordance with the example in FIG. 11.

FIG. 11 illustrates aspects in connection with the multi-pixel polarization filter 121 and with the multi-pixel detector 122. In principle, the example in FIG. 11 corresponds to the example in FIG. 2. The example in FIG. 11 illustrates a scenario in which the multi-pixel polarization filter 121 and the multi-pixel detector 122 and also a multi-pixel spectral filter 123 are integrated on a common substrate 501, e.g. silicon. Corresponding layers 502, 503, 504 composed of semiconductor material are applied on the substrate 501, in and/or on which layers the polarization filter pixel elements 125 of the multi-pixel polarization filter 121 and also the detector pixel elements 126 of the multi-pixel detector 122 and also the spectral filter pixel elements 127 of the multi-pixel spectral filter 123 are defined.

In this case, it is not mandatory for the multi-pixel detector 122, the multi-pixel polarization filter 121 and also the multi-pixel spectral filter 123 to be integrated jointly on a substrate 501. It would also be conceivable, for example, for the multi-pixel spectral filter 123 to be arranged separately on an arrangement in accordance with FIG. 2. More-over, the multi-pixel spectral filter 123 could be arranged between the multi-pixel polarization filter 121 and the multi-pixel detector 122.

By virtue of the arrangement in accordance with FIG. 11, the pixels of the image data are also spectrally encoded.

The lateral arrangement of the spectral ranges filtered by the various spectral filter pixel elements 127 can vary in this case. A mosaic arrangement in accordance with a Bayer filter would be conceivable, for example. That is illustrated e.g. in FIG. 12, where FIG. 12 basically corresponds to FIG. 4.

Figure 12:
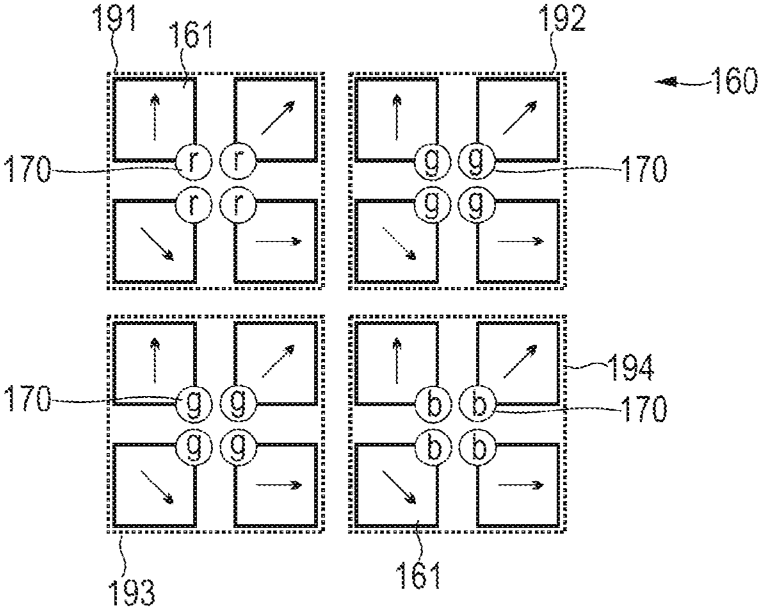
FIG. 12 illustrates image data of the multi-pixel detector from FIG. 11 in accordance with various examples, use being made of a Bayer superpattern for a multiplicity of spectral filter pixel elements of the multi-pixel spectral filter.

FIG. 12 indicates the filtered spectral ranges 170 (here red-green-blue) for the various pixels 161 of the image data 160. In this case, the Bayer filter mosaic of the spectral filter pixel elements 127 forms a superpattern with respect to the pattern of the polarizations filtered by the polarization filter pixel elements 125 (in other variants, the polarization filter pixel elements 125 could also form a superpattern of filtered polarizations with respect to the Bayer filter mosaic). In the example in FIG. 11, it is then possible to use in each case four polarization filter pixel elements 125 for each of the spectral filter pixel elements 127 (that is to say that the spectral filter pixel elements 127 are larger than the polarization filter pixel elements and the detector pixel elements 126).

Such a relative arrangement of the polarization filter pixel elements 125 and the spectral filter pixel elements 127 can be taken into account in the group formation (cf. FIG. 4). By way of example, the following groups could be formed (in this case, therefore, a respective group is formed for each permutation of the filtered polarization directions and filtered spectral ranges):

TABLE 1

Examples of groups for a combination of multi-pixel polarization filter and multi-pixel spectral filter

| Group | Polarization direction | Spectral range |
|---|---|---|
| 1a | 0° | Red |
| 1b | 45° | Red |
| 1c | 90° | Red |
| 1d | 135° | Red |
| 2a | 0° | Green |
| 2b | 45° | Green |
| 2c | 90° | Green |
| 2d | 135° | Green |
| 3a | 0° | Blue |
| 3b | 45° | Blue |
| 3c | 90° | Blue |
| 3d | 135° | Blue |

The various groups can then be respectively evaluated according to the groups 171-174 from FIG. 4. By way of example, the groups 1a-1d could be evaluated in accordance with the groups 171-174, as could respectively the groups 2a-2d or the groups 3a-3d.

In summary, techniques have been described above in which a particle analysis for a surface of a sample object is implemented with a light-microscopic polarizer-analyser approach. In this case, the analyser is implemented by a multi-pixel polarization filter and a multi-pixel detector.

It goes without saying that the features of the embodiments and aspects of the invention described above can be combined with one another. In particular, the features can be used not only in the combinations described but also in other combinations or on their own without departing from the scope of the invention.

By way of example, a description has been given above of various examples in connection with the use of a 2-D array of pixels of a multi-pixel detector and of a multi-pixel polarization filter. In other examples, other arrangements of pixels can also be used, for example a linear arrangement.

Furthermore, a description has been given above of various techniques in connection with the use of a multi-pixel detector in connection with light-microscopic particle analysis. However, the corresponding techniques can generally also be used for other light-microscopic applications for the examination of sample objects, e.g. in connection with phase contrast imaging.

What is claimed is:

1. An optical system, comprising:

a sample holder configured to fix a sample object, a light microscope, which defines an illumination light path and a detection light path for microscopy of the sample object with polarized light, at least one camera comprising a multi-pixel detector having a multiplicity of detector pixel elements, and a multi-pixel polarization filter having a multiplicity of polarization filter pixel elements, wherein the multi-pixel polarization filter is arranged between the sample holder and the multi-pixel detector in the detection light path, wherein the multi-pixel detector is configured to provide image data, and a computer logic element configured to calculate at least one polarization image of the sample object on the basis of the image data, wherein the computer logic element is furthermore configured to carry out a particle analysis for a surface of the sample object on the basis of the at least one polarization image, wherein the multi-pixel polarization filter comprises at least two groups of polarization filter pixel elements, wherein the polarization filter pixel elements of the at least two groups each filter different polarization directions of light, wherein the at least two groups comprise a first group and a second group, wherein the polarization directions filtered by the polarization filter pixel elements of the first group and of the second group form a first basis for the space of the polarization directions, wherein the at least two groups comprise a third group and a fourth group, wherein the polarization directions filtered by the polarization filter pixel elements of the third group and of the fourth group form a second basis for the space of the polarization directions, the first basis and the second basis being independent from one another, wherein the computer logic element is configured to:

determine a first pixel value for each pixel of the at least one polarization image based on image data corresponding to the polarization filter pixel elements that filter the polarization directions of the first basis;

determine, independently of the first pixel value, a second pixel value for each pixel of the at least one polarization image based on image data corresponding to the polarization filter pixel elements that filter the polarization directions of the second basis; and combine the first pixel value and the second pixel value to obtain a pixel value for each pixel of the at least one polarization image.

2. The optical system according to claim 1, wherein the computer logic element is configured to interpolate pixel values of the image data in order to obtain an increased resolution for the image data.

3. The optical system according to claim 1, wherein the computer logic element is configured to average neighbouring pixel values of the image data in order to obtain an increased signal-to-noise ratio for the image data.

4. The optical system according to claim 1, wherein the combination is effected in a weighted fashion.

5. The optical system according to claim 1, wherein the light microscope comprises a polarizer arranged in the illumination light path in order to polarize the light.

6. The optical system according to claim 1, wherein the at least one camera furthermore comprises a multi-pixel spectral filter having a multiplicity of spectral filter pixel elements, which is arranged upstream of the multi-pixel detector in the detection light path.

7. The optical system according to claim 6, wherein the spectral ranges filtered by the multiplicity of spectral filter pixel elements form a superpattern with respect to a pattern formed by the polarization directions filtered by the multiplicity of polarization filter pixel elements.

8. A method, comprising:

controlling a multi-pixel detector associated with a multi-pixel polarization filter, and receiving image data that microscopically image a sample object by means of the multi-pixel detector, on the basis of the image data: calculating at least one polarization image of the sample object, and on the basis of the at least one polarization image: carrying out a particle analysis for a surface of the sample object, wherein the multi-pixel polarization filter comprises at least two groups of polarization filter pixel elements, wherein the polarization filter pixel elements of the at least two groups each filter different polarization directions of light, wherein the at least two groups comprise a first group and a second group, wherein the polarization directions filtered by the polarization filter pixel elements of the first group and of the second group form a first basis for the space of the polarization directions, wherein the at least two groups comprise a third group and a fourth group, wherein the polarization directions filtered by the polarization filter pixel elements of the third group and of the fourth group form a second basis for the space of the polarization directions, the first basis and the second basis being independent from one another, determining a first pixel value for each pixel of the at least one polarization image based on image data corresponding to polarization filter pixel elements that filter the polarization directions of the first basis;

determining, independently of the first pixel value, a second pixel value for each pixel of the at least one polarization image based on image data corresponding to polarization filter pixel elements that filter the polarization directions of the second basis; and combining the first pixel value and the second pixel value to obtain the pixel value for each pixel of the at least one polarization image.

9. The method according to claim 8, wherein the method is implemented by a computer logic element of an optical system comprising:

a sample holder configured to fix a sample object, a light microscope, which defines an illumination light path and a detection light path for microscopy of the sample object with polarized light, at least one camera comprising a multi-pixel detector having a multiplicity of detector pixel elements, and a multi-pixel polarization filter having a multiplicity of polarization filter pixel elements, wherein the multi-pixel polarization filter is arranged between the sample holder and the multi-pixel detector in the detection light path, wherein the multi-pixel detector is configured to provide image data, and the computer logic element configured to calculate at least one polarization image of the sample object on the basis of the image data, wherein the computer logic element is furthermore configured to carry out a particle analysis for a surface of the sample object on the basis of the at least one polarization image.

10. A method of performing light-microscopic examination of a sample object, comprising:

using a multi-pixel detector having a multiplicity of detector pixel elements, and a multi-pixel polarization filter having a multiplicity of polarization filter pixel elements;

wherein the multi-pixel polarization filter comprises at least two groups of polarization filter pixel elements, wherein the polarization filter pixel elements of the at least two groups each filter different polarization directions of light, wherein the at least two groups comprise a first group and a second group, wherein the polarization directions filtered by the polarization filter pixel elements of the first group and of the second group form a first basis for the space of the polarization directions, wherein the at least two groups comprise a third group and a fourth group, wherein the polarization directions filtered by the polarization filter pixel elements of the third group and of the fourth group form a second basis for the space of the polarization directions, the first basis and the second basis being independent from one another, determining a first pixel value for each pixel of at least one polarization image based on image data corresponding to polarization filter pixel elements that filter the polarization directions of the first basis;

determining, independently of the first pixel value, a second pixel value for each pixel of the at least one polarization image based on image data corresponding to polarization filter pixel elements that filter the polarization directions of the second basis; and combining the first pixel value and the second pixel value to obtain the pixel value for each pixel of the at least one polarization image.

11. The method according to claim 10, further comprising performing a particle analysis of a surface of the sample object.

* * * * *